United States Patent
Kokeguchi

[11] Patent Number: 6,082,763
[45] Date of Patent: Jul. 4, 2000

[54] AIR BELT AND AIR BELT DEVICE

[75] Inventor: Akira Kokeguchi, Echi-gun, Japan

[73] Assignee: Takata Corporation, Tokyo, Japan

[21] Appl. No.: 09/205,097

[22] Filed: Dec. 3, 1998

[30] Foreign Application Priority Data

Dec. 3, 1997 [JP] Japan ............................ 9-332877

[51] Int. Cl.⁷ ............................ B60R 21/18; B60R 22/00
[52] U.S. Cl. ............................ 280/733; 280/801.1
[58] Field of Search .................. 280/733, 801.1, 280/805, 808; 297/464, 468, 482, 483

[56] References Cited

U.S. PATENT DOCUMENTS

| | | | |
|---|---|---|---|
| 3,801,156 | 4/1974 | Granig | 297/386 |
| 3,820,842 | 6/1974 | Stephenson | 297/389 |
| 3,841,654 | 10/1974 | Lewis | 280/150 |
| 3,866,940 | 2/1975 | Lewis | 280/733 |
| 3,933,370 | 1/1976 | Abe et al. | 280/150 AB |
| 3,970,329 | 7/1976 | Lewis | 280/733 |
| 5,062,662 | 11/1991 | Cameron | 280/733 |
| 5,385,367 | 1/1995 | Tanaka et al. | 280/733 |
| 5,390,953 | 2/1995 | Tanaka et al. | 280/733 |
| 5,393,091 | 2/1995 | Tanaka et al. | 280/733 |
| 5,839,753 | 11/1998 | Yaniv et al. | 280/733 |
| 5,851,055 | 12/1998 | Lewis | 297/483 |
| 5,947,513 | 9/1999 | Lehto | 280/733 |

FOREIGN PATENT DOCUMENTS

| | | |
|---|---|---|
| 5-85301 | 4/1993 | Japan . |
| 6-56001 | 3/1994 | Japan . |

*Primary Examiner*—Paul N. Dickson
*Assistant Examiner*—Faye M. Fleming
*Attorney, Agent, or Firm*—Foley & Lardner

[57] ABSTRACT

To provide an air belt in which a cover is prevented from moving freely relative to an envelope-like belt, and an air belt device employing the air belt. An air belt 2B comprises an envelope-like belt 10, which is folded into a band-like configuration, and a knit cover 12 made of woven fabric and surrounding the envelope-like belt 10. The inner surface of the knit cover 12 and the outer surface of the folded envelope-like belt 10 are bonded to each other by adhesive layers 11. Overlapped portions 12a of the knit cover 12 extending along the sides of the knit cover 12 are bonded by the adhesive layers 11. The knit cover 12 can be stretched in the width direction, but is hardly stretched in the longitudinal direction because it is processed by hot-drawing.

8 Claims, 11 Drawing Sheets

AIR BELT AND AIR BELT DEVICE

DETAILED DESCRIPTION

1. Industrial Field of the Invention

The present invention relates to an air belt used in a seat belt device for protecting a vehicle occupant at a vehicle collision, and more particularly to an air belt comprising an envelope-like belt, which is inflated with gas from a gas generator, and an air belt device employing the same.

2. Prior Art

Figure 9A:
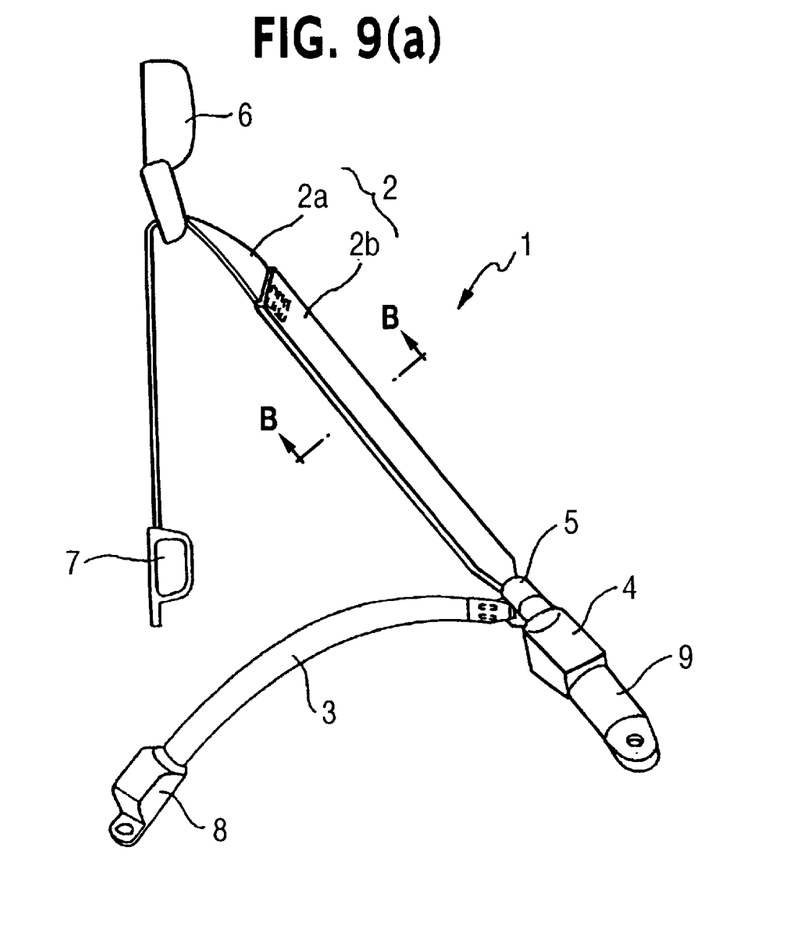
FIGS. 9(a) and 9(b) are structural views of a conventional air belt device.
Figure 9B:
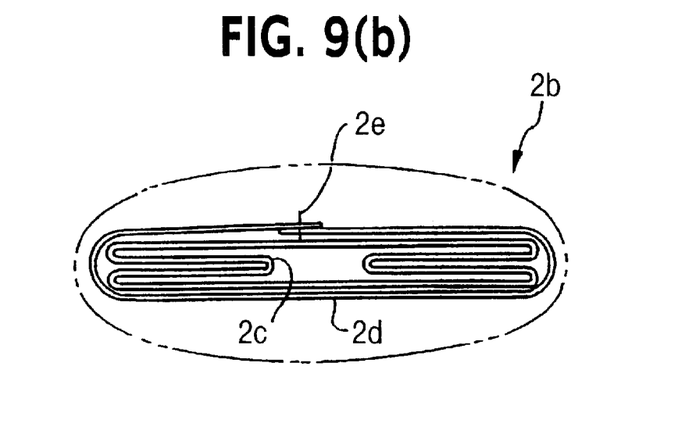

One of such conventional air belt devices is described in Japanese Patent Unexamined Publication No. H05-85301. FIG. 9(a) is a perspective view of an air belt device of the publication and FIG. 9(b) is a sectional view taken along line B—B of FIG. 9(a).

The air belt device 1 comprises a shoulder belt 2 to be extended at an angle from the right side to the left side of an occupant, a lap belt 3 to be extended from the right side to the left side of the occupant, a buckle 4 fixed to, for example, a vehicle floor, a tongue 5 to be inserted into and engaged with the buckle 4 when the occupant wears the seat belt, and an intermediate guide 6 for guiding the shoulder belt 2.

The shoulder belt 2 comprises a normal belt 2a which is the same as a typical conventional seat belt, and an air belt 2b connected to an end of the normal belt 2a. The normal belt 2a is slidably hung by the intermediate guide 6. The other end of the normal belt 2a is connected to a seat belt retractor 7 with an emergency locking mechanism (ELR) which is fixed to the vehicle body. The normal belt 2a is arranged in such a manner as to be wound into the seat belt retractor 7.

The air belt 2b is positioned to be in contact with the occupant and is connected to the tongue 5 at an end opposite to the end connected to the normal belt 2a.

The lap belt 3 comprises a normal belt which is the same as a typical conventional seat belt, of which one end is connected to the tongue 5 and the other end is connected to a seat belt retractor 8 with an emergency locking mechanism (ELR) which is fixed to the vehicle body. Connected to the buckle 4 is a gas generator 9 which acts in case of emergency such as a vehicle collision to generate high-pressure gas.

The tongue 5 and the buckle 4 are provided with paths for introducing gas from the gas generator 9 to the air belt 2b.

The air belt 2b comprises an belt body 2c formed in an envelop shape and a cover 2d. The belt body 2c is folded as shown by solid lines in FIG. 9(b) and covered by the cover 2d. The both ends of the cover 2d are then connected by stitching 2e so that the air belt 2b is normally kept in a band-like shape. The stitching 2e of the cover 2d is easily torn by expansion force of the shoulder belt 2 when the gas generator 9 is actuated so that the air belt 2b is developed as shown by a two-dot chain line.

FIG. 17 of Japanese Patent Unexamined Publication No. H6-56001, FIG. 3 of U.S. Pat. No. 3,801,156, and FIG. 2 of U.S. Pat. No. 3,841,654 disclose that an air belt in which portions overlapped with each other in its folded state are connected by a fastener, a snap fastener, or stitching so that the folded member is kept in a flat band-like shape.

PROBLEMS TO BE RESOLVED BY THE INVENTION

In the conventional air belt, the cover 2d only surrounds and overlap with the belt body 2C, so the cover 2d may be separated from the belt body 2c by pinching the cover 2d or may be slid for example when some force is exerted on the cover 2d.

It is an object of the present invention to provide an air belt in which a cover is prevented from moving freely relative to a belt body, and an air belt device employing the air belt.

MEANS TO SOLVE THE PROBLEMS

An air belt of the present invention comprises: a folded body which is an envelope-like belt folded into a band-like configuration; and a cover extendable for covering the folded body of the envelope-like belt. The envelope-like belt is inflatable by introduced gas, the air belt being characterized in that the inner surface of the cover is bonded to the outer surface of the folded body.

In the air belt, the outer surface of the folded body and the inner surface of the cover are bonded to each other, thereby preventing the cover from moving freely relative to the folded body.

The bonding is preferably adhesion or sticking. In case of adhesion, the folded body and the cover are preferably bonded to each other by heating thermoplastic resin interposed therebetween.

The folded body and the cover may be entirely bonded or partially bonded. In case of the latter, bonded portions may be arranged at intervals in the longitudinal direction of the folded body.

It is preferable that the bonding portion between the cover and the folded body has such strength that the bonding is cancelled when the folded body is inflated.

In the present invention, overlapped portions of the folded body may be bonded by adhesion or sticking to keep the shape of the folded body.

An air belt device of the present invention comprises: an air belt which is inflatable; a gas generator for supplying gas into the air belt to inflate the air belt; and a belt engagement device including a tongue to which the air belt is connected and a buckle which the tongue is engaged with. The air belt device is characterized in that the air belt is the aforementioned air belt of the present invention.

EMBODIMENTS FOR CARRYING OUT THE INVENTION

Figure 1A:
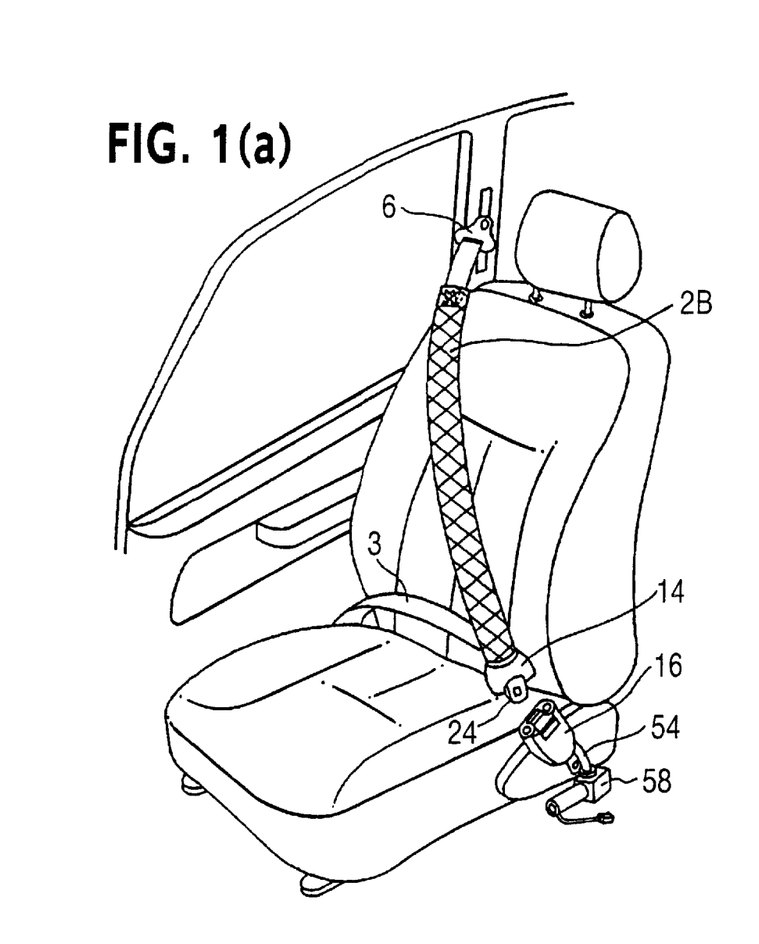
FIG. 1(a) is a perspective view of a seat on which an air belt device according to an embodiment is installed and FIG. 1(b) is a perspective view of the air belt device.
Figure 1B:
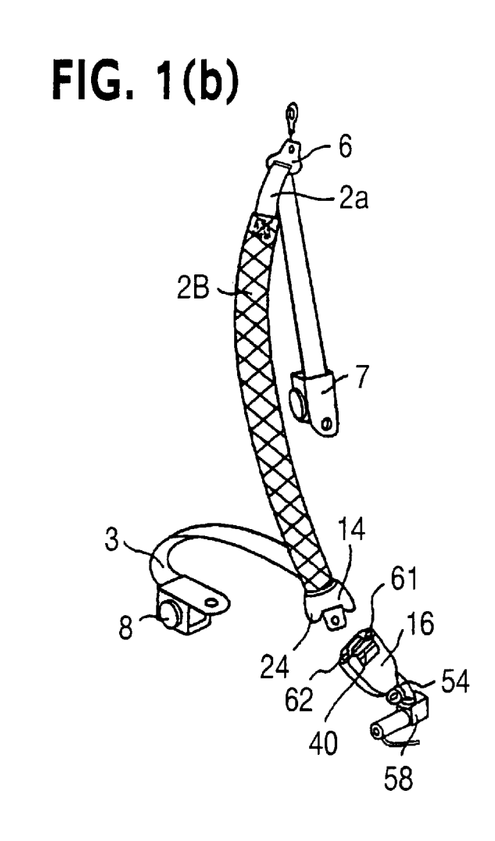
Figure 2A:
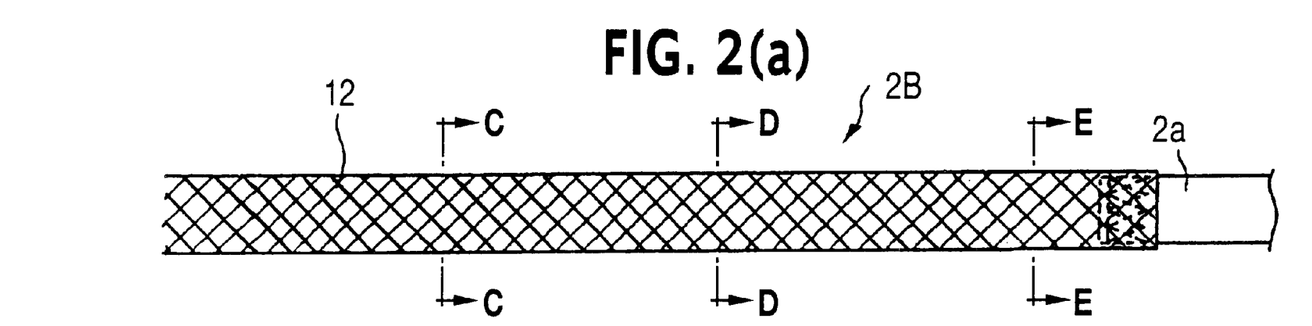
FIGS. 2(a) through 2(e) are structural views of the air belt.
Figure 2B:
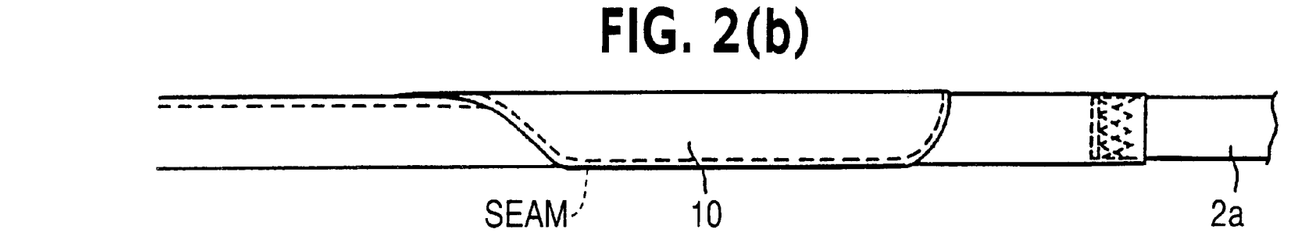
Figure 2C:
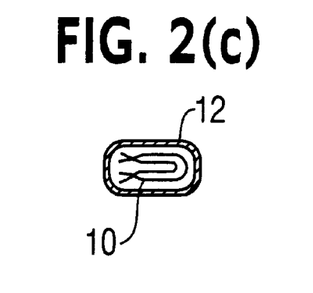
Figure 2D:
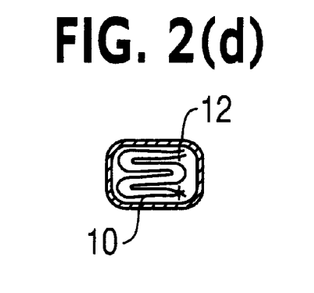
Figure 2E:
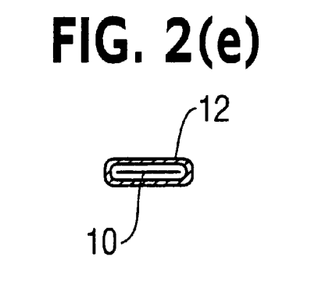
Figure 3A:
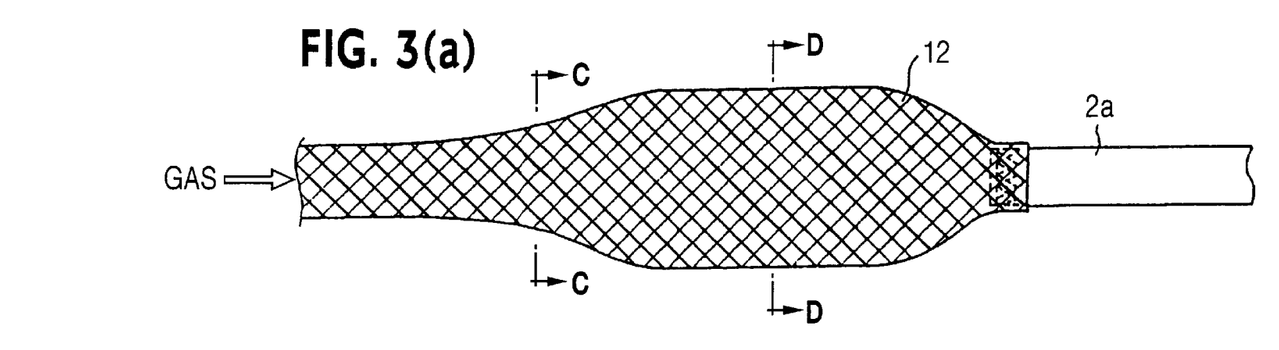
FIGS. 3(a) through 3(d) are structural views of the air belt in the deployed state.
Figure 3B:
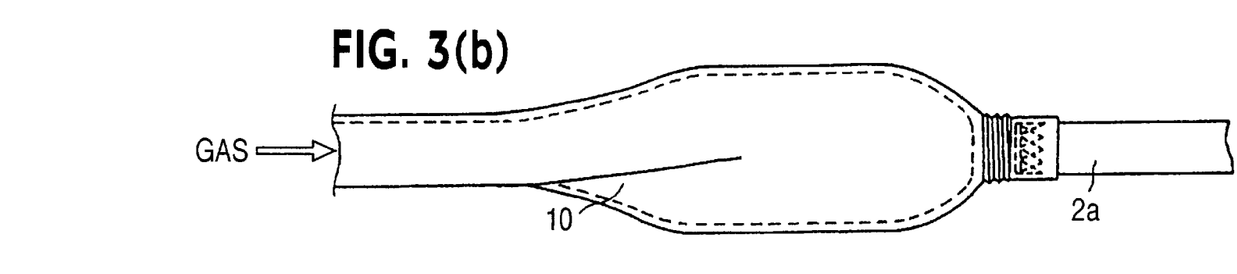
Figure 3C:
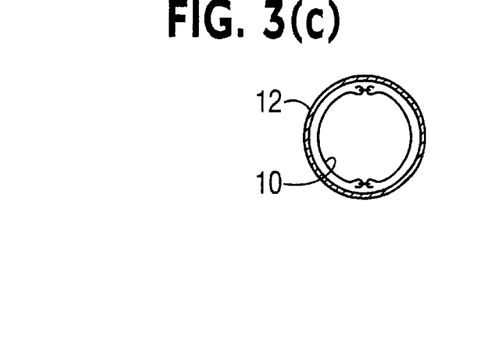
Figure 3D:
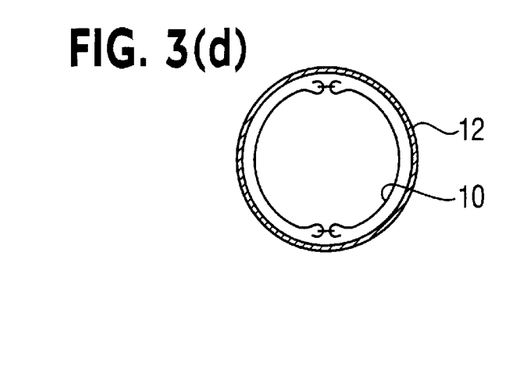
Figure 10:
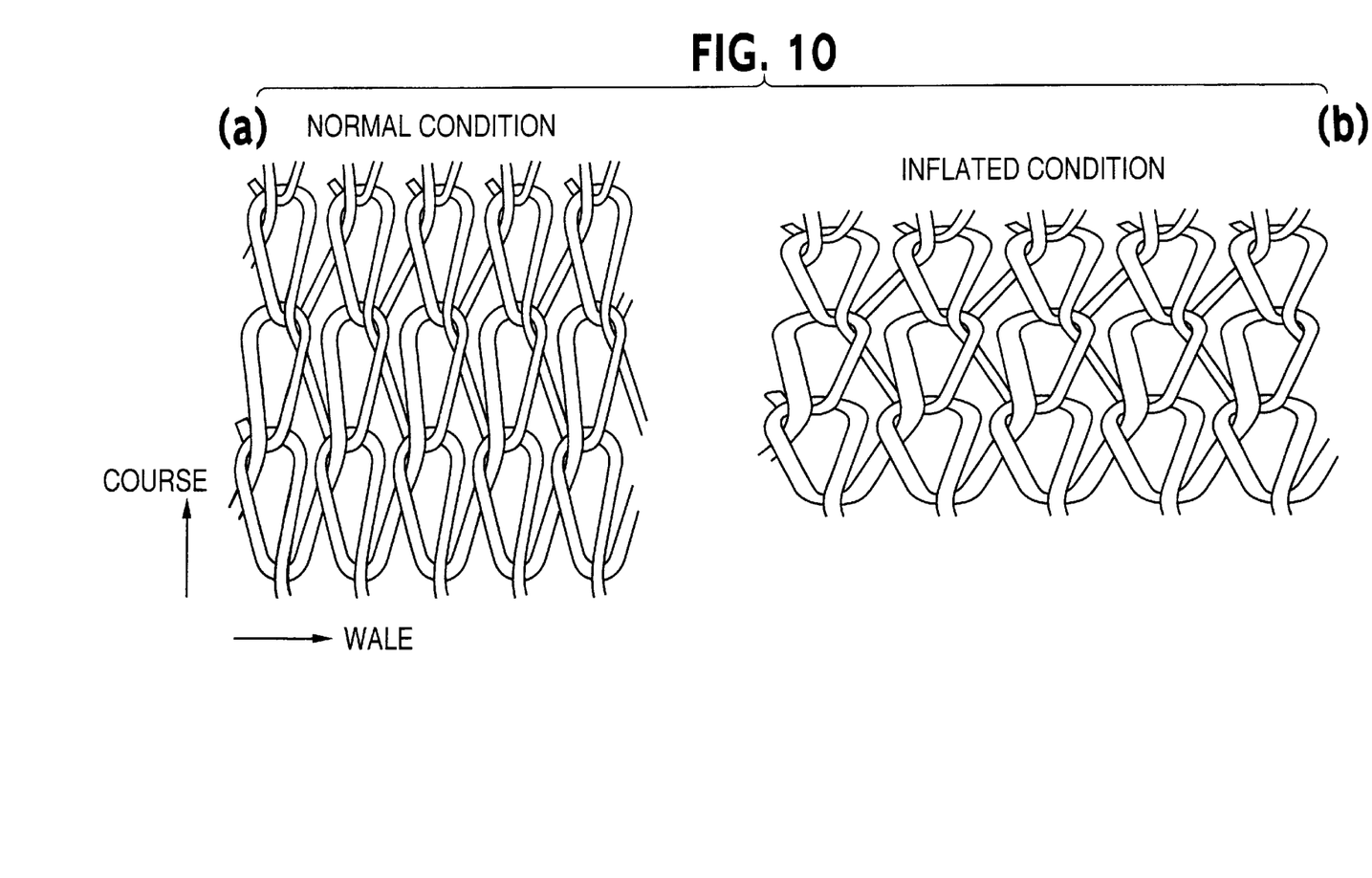
FIGS. 10(a) and 10(b) are structural views of a knit cover.
Figure 11:
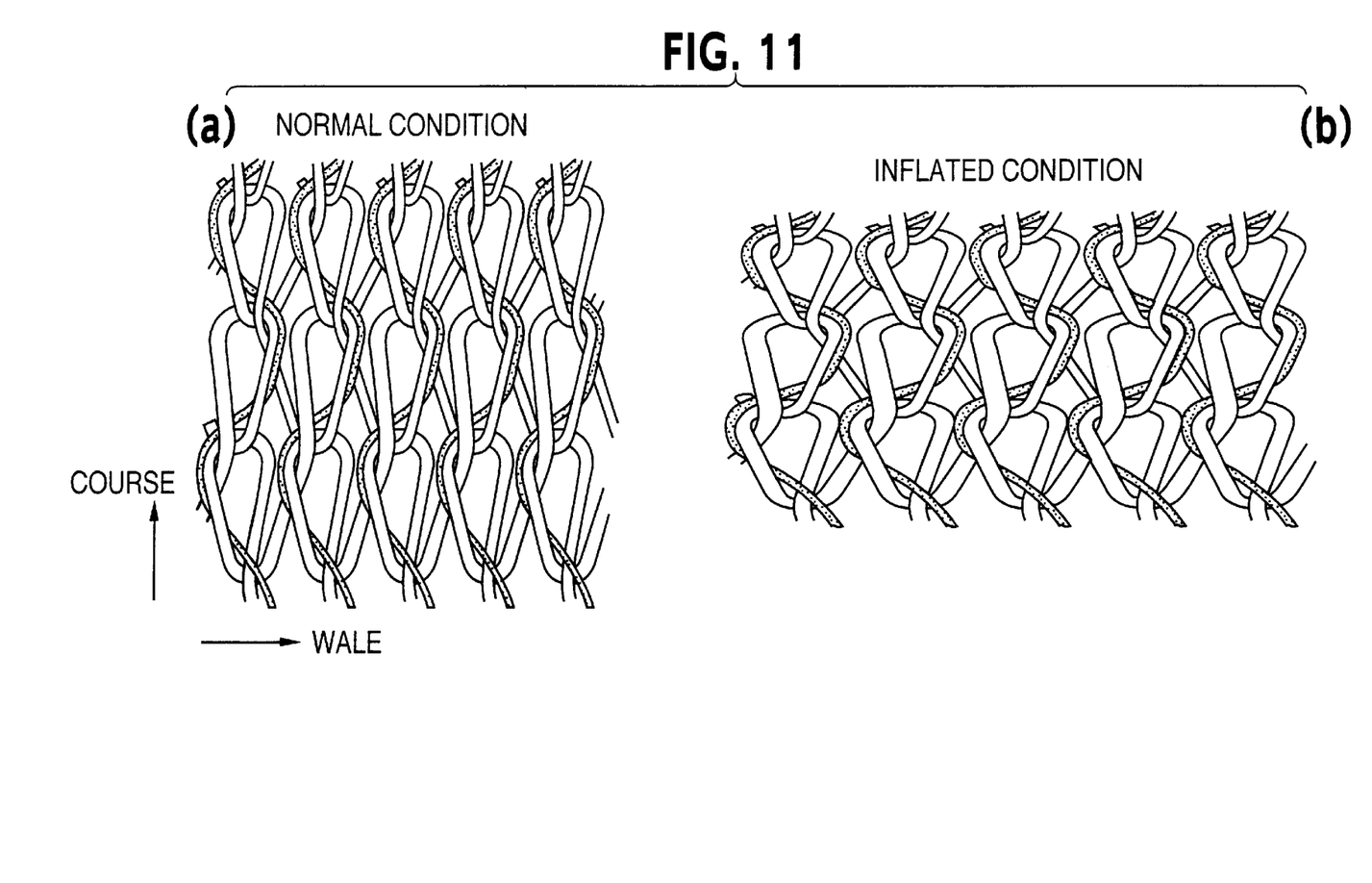
FIGS. 11(a) and 11(b) are structural views of a knit cover.

Hereinafter, an embodiment will be described with reference to the drawings. FIG. 1(a) is a perspective view of a cabin of a vehicle in which an air belt device according to the embodiment is installed and FIG. 1(b) is a perspective view showing the air belt device. FIG. 2(a) is a plan view showing a portion around a joint between a normal belt and an air belt, FIG. 2(b) is a plan view of an envelope-like belt, and FIGS. 2(c), (d), (e) are sectional views taken along lines C—C, D—D, and E—E in FIG. 2(a), respectively. FIG. 3(a) is a plan view of the shoulder belt when the air belt is in the deployed state, FIG. 3(b) is a plan view of the envelope-like belt in the deployed state, and FIGS. 3(c) and 3(d) are sectional views taken along lines C—C and D—D in FIG. 3(a), respectively. FIGS. 4(a) through 4(d) are structural views of an air belt. FIG. 5 through FIG. 8 are explanatory illustrations of a belt engagement device. FIGS. 10 and 11 are structural views of a knit cover.

As shown in FIG. 2 through FIG. 4, an air belt 2B comprises an envelope-like belt 10 and a knit cover 12 made of woven fabric and surrounding the envelope-like belt 10. The envelope-like belt 10 is formed in such a configuration that a portion confronting the chest and abdomen of an occupant in a seat has a larger area. The portion with larger area is folded to be in a band-like configuration as shown in FIGS. 2(b), 2(c) and 2(d).

The inner surface of the knit cover 12 is bonded to the outer surface of the envelope-like belt 10 by adhesive layers 11.

FIGS. 4(a), 4(b), 4(c), and 4(d) are schematic sectional views and sectional perspective views illustrating examples of the arrangement of the adhesive layers 11. In FIGS. 4(a) through 4(d), the air belt 2B is illustrated with enlarged in the thickness direction. The air belt 2B has, in reality, 3–6 mm in thickness and 50–70 mm in width.

Figure 4A:
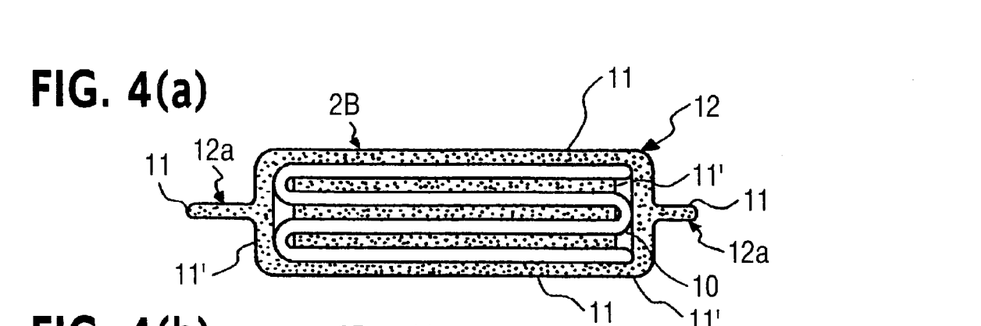
FIGS. 4(a) and 4(b) are sectional views of the air belt.
Figure 4B:
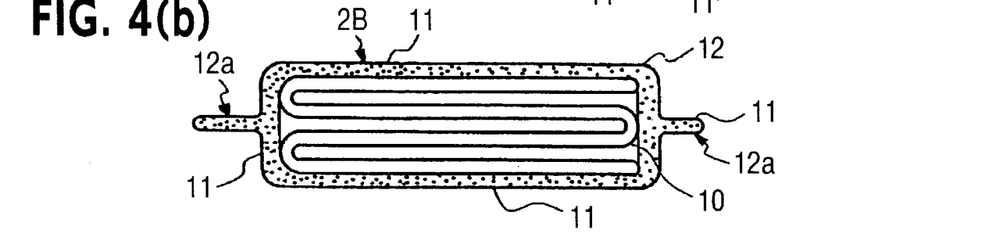

In FIGS. 4(a), 4(b), the adhesive layers 11 bond the entire outer surface of the envelope-like belt 10 in the folded state and the inner surface of the knit cover 12. In FIG. 4(a), portions overlapped with each other of the envelope-like belt 10 in the folded state are also bonded to each other by adhesive layers 11'. In FIG. 4(b), the outer surface of the envelope-like belt 10 in the folded state is entirely bonded to the knit cover 12 and the portions overlapped with each other of the envelope-like belt 10 are not bonded to each other.

Figure 4C:
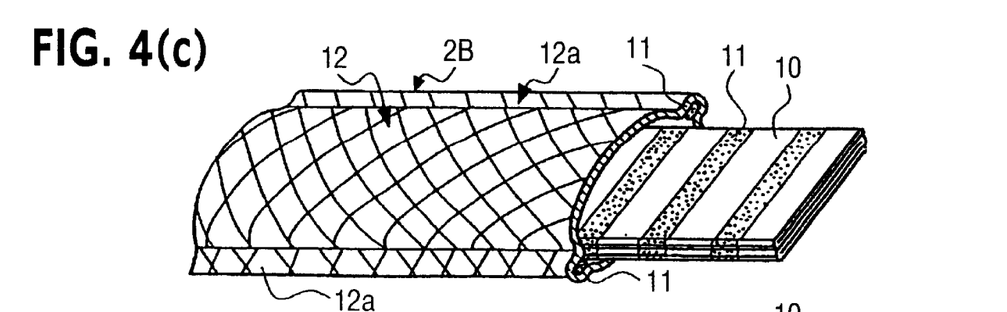
FIGS. 4(c) and 4(d) are perspective views showing the inside structures of the air belt.

In FIG. 4(c), each adhesive layer 11 is provided in a bead-like configuration. The bead-like adhesive layers 11 extend in the width direction of the envelope-like belt 10 and are arranged with at predetermined intervals in the longitudinal direction of the envelope-like belt 10.

Figure 4D:
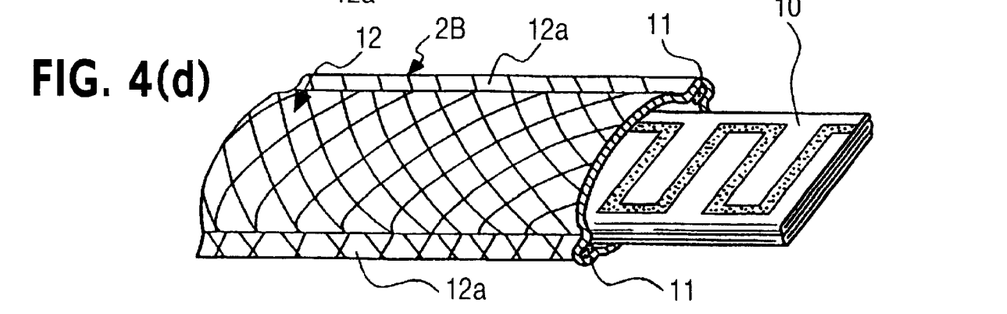

In FIG. 4(d), the adhesive layers 11 are arranged in a zigzag configuration extending continuously in the longitudinal direction of the envelope-like belt 10.

FIGS. 4(c), (d) show examples of a case of partially bonding the knit cover 12 to the envelope-like belt 10. It should be understand that adhesive layers having patterns other than those shown in FIGS. 4(c), (d) may be employed. For example, the adhesive layers may be arranged in a lattice pattern or scattered-point pattern. Furthermore, the adhesive layers may be arranged in a pattern in which the bonded areas and the non-bonded areas are reversed.

FIGS. 4(a) through 4(d), the knit cover 12 is formed flat. Overlapped portions 12a of the knit cover 12 extending along the sides of the knit cover 12 are bonded by the adhesive layers 11. In such a manner, the knit cover 12 is kept in a flat band-like shape.

To form the adhesive layers 11 of FIGS. 4(a) through 4(d), a thermoplastic resin film of such as thermoplastic urethane is laminated on the inner surface of the knit cover 12. The knit cover 12 is then disposed to cover the folded envelope-like belt 10 and, after that, heated in the pressed state. In this case, the entire outer surface of the folded envelope-like belt and the knit cover 12 can be bonded as shown in FIG. 4(a) by heating them overall. On the other hand, they can be partially bonded as shown in FIGS. 4(c), (d), by heating only portions appointed to be bonded.

To form the adhesive layers 11' bonding the portions of the folded belt in FIG. 4(a), a thermoplastic resin film is laminated on the outer surface of the envelope-like belt 10.

In the present invention, sticky agent may be used instead of the adhesive agent. The sticky agent is suitably used for bonding the portions overlapped with each other of the folded envelope-like belt, just like the adhesive layers 11' of FIG. 4(a). In this case, the sticky agent is applied on the outer surface of the envelope-like belt 10 and, after that, the envelope-like belt 10 is folded so that the overlapped portions are bonded to each other.

In the air belt 2B in which the knit cover 12 is bonded to the outer surface of the folded envelope-like belt 10 in the aforementioned manner, the knit cover 12 will not be separated from the envelope-like body 10 even when the knit cover 12 is pinched, so there is no chance of slippage between the knit cover 12 and the envelope-like belt 10 nor twisting of only the envelope-like belt 10 inside the knit cover 12. As the knit cover 12 and the envelope-like belt 10 are integrally bonded to each other, the touch of the air belt 2B is improved and the restraint of the occupant's body when the seat belt retractor is locked becomes more secure (there is no possibility that the knit cover 12 is drawn by the occupant's body and thus slips on the surface of the envelope-like belt 10.). In the embodiment shown in FIG. 4(a), the portions of the folded envelope-like belt 10 are also bonded to each other by the adhesive layers 11', thereby providing excellent form-maintainability of the folded envelop belt 10.

The knit cover 12 can be stretched in the width direction, but is hardly stretched in the longitudinal direction because it is processed by hot-drawing. The knit cover 12 is subjected to tensile load applied to the air belt 2B. In FIG. 10 and FIG. 11, illustrations at the left hand side show examples of way of knitting the knit cover. FIG. 10 shows a normal warp knitting and FIG. 11 shows a warp knitting in which insert yarns are added to improve the strength and to allow the thickness more thin.

One end of the air belt 2B and the normal belt 2a are connected by sewing. The envelope-like belt 10 and the knit cover 12 are both sewn to the normal belt 2a. The other end of the air belt 2B is connected to the tongue 17. The envelope-like belt 10 and the knit cover 12 are also both connected to the tongue 17.

Once a gas generator is actuated in the state that the tongue 14 is engaged with the buckle, the air belt 2B is inflated. At this point, the length of the knit cover 12 in the longitudinal direction of the air belt 2B is reduced so that the air belt 2B comes in close contact with the occupant, thereby securely protecting the occupant. In FIG. 10 and FIG. 11, illustrations at the right hand side show the state that the length of the knit cover 12 is reduced in the longitudinal direction when the air belt 2B (the envelope-like belt 10) is inflated. As mentioned above, the knit cover is hardly stretched in the longitudinal direction because it is processed by hot drawing. The knitted loops of the knit cover 12 are extended in the lateral direction when the envelope-like belt 10 is inflated. As a result of this, the knit cover 12 shrinks its length in the longitudinal direction to reduce the length of the air belt 2B in the longitudinal direction.

Figure 5A:
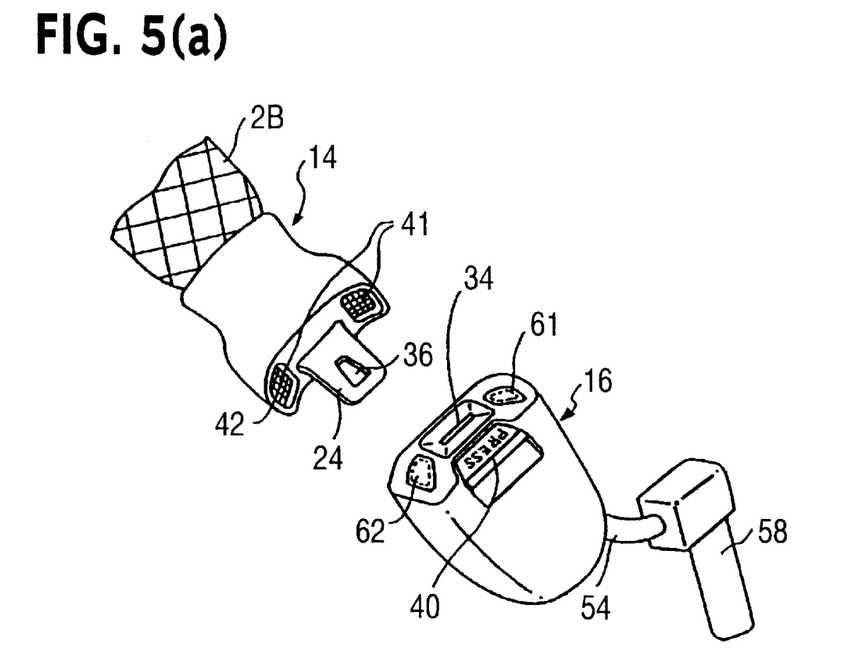
FIGS. 5(a) and 5(b) are structural views of a tongue and a buckle of the air belt device according to the embodiment of the present invention.
Figure 5B:
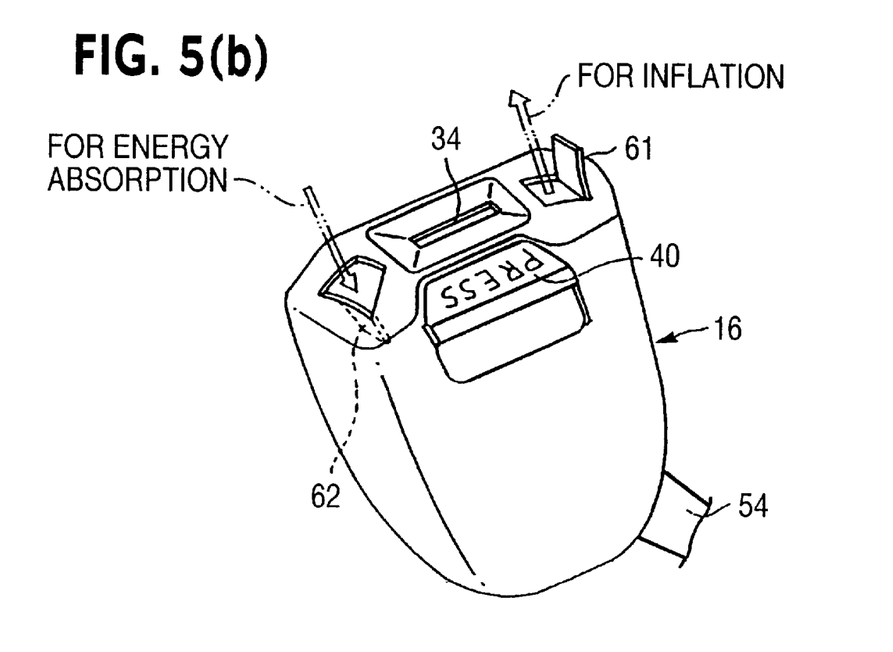
Figure 6A:
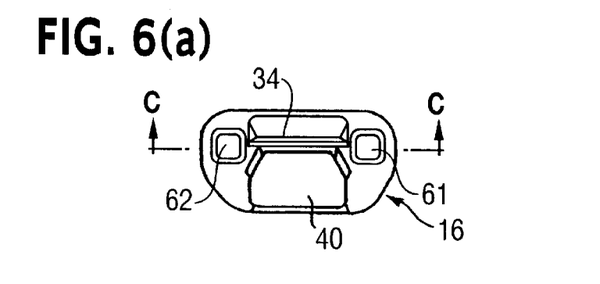
FIGS. 6(a) through 6(c) are structural views of the buckle of FIG. 5(a).
Figures 6B, 6C:
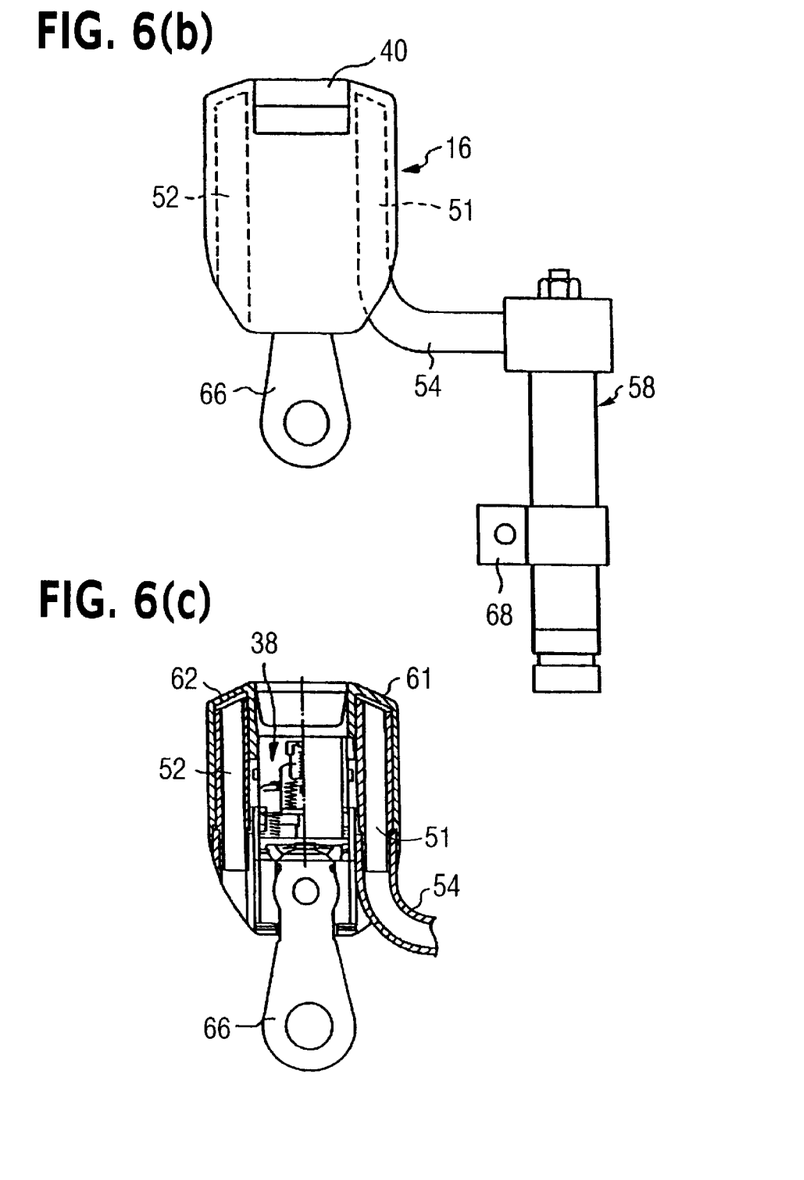
Figure 7A:
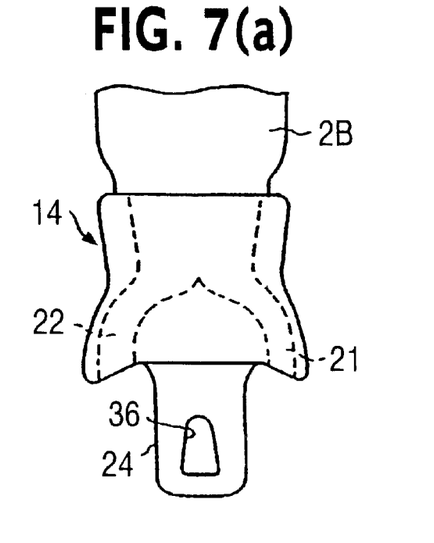
FIGS. 7(a) through 7(d) are structural views of the tongue of FIG. 5(a).
Figure 7B:
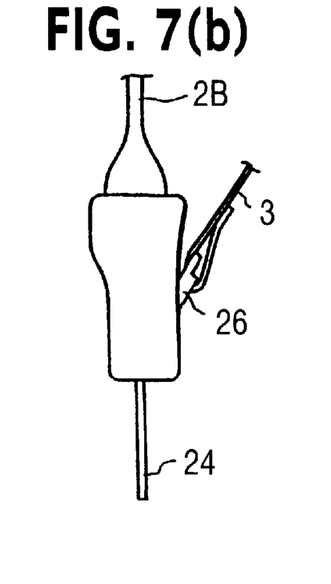
Figure 7C:
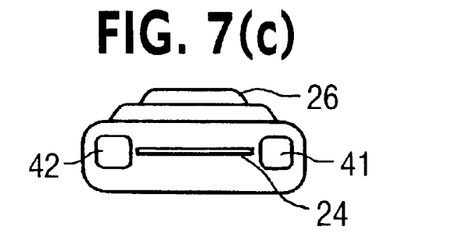
Figure 7D:
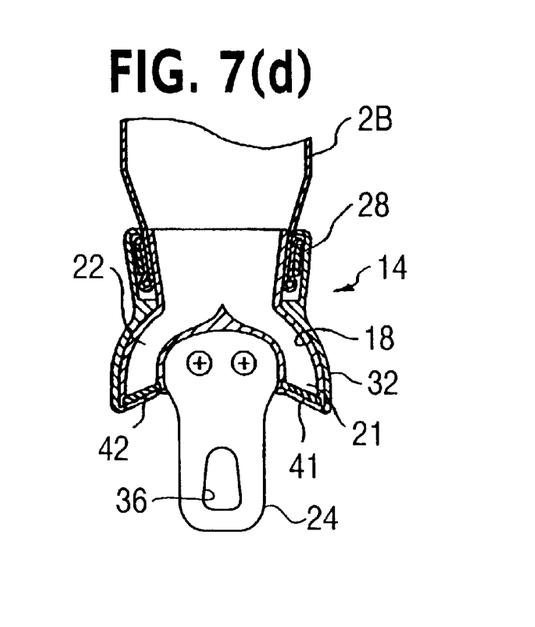
Figure 8A:
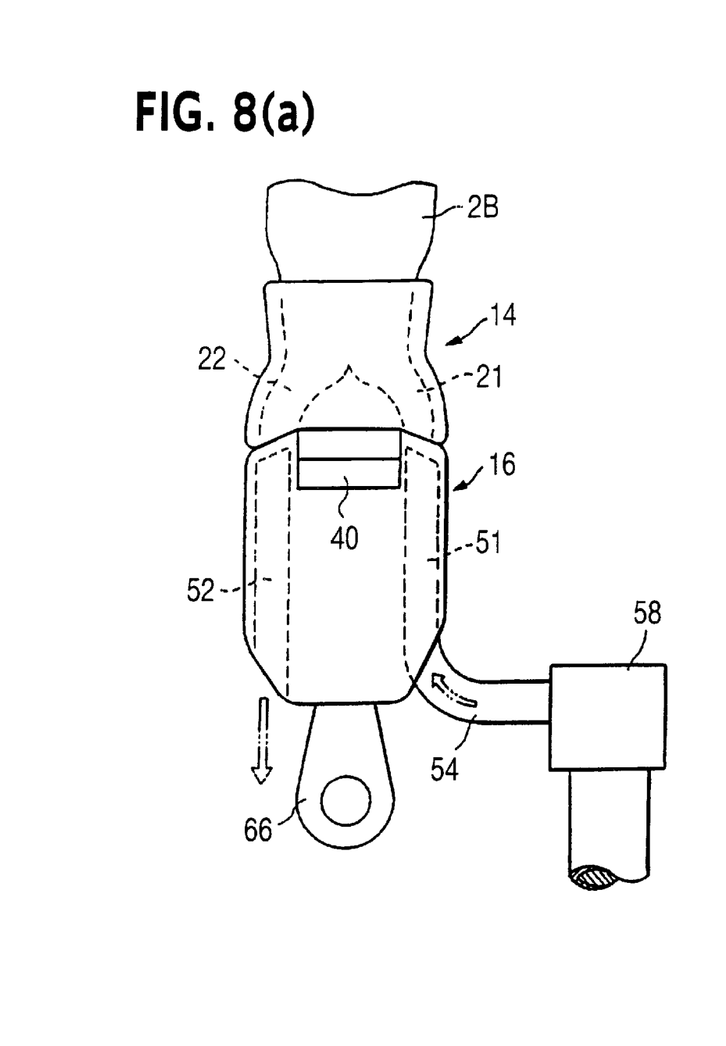
FIGS. 8(a) and 8(b) are a front view and a sectional view of the buckle and the tongue of FIG. 5(a) in the engaged state.
Figure 8B:
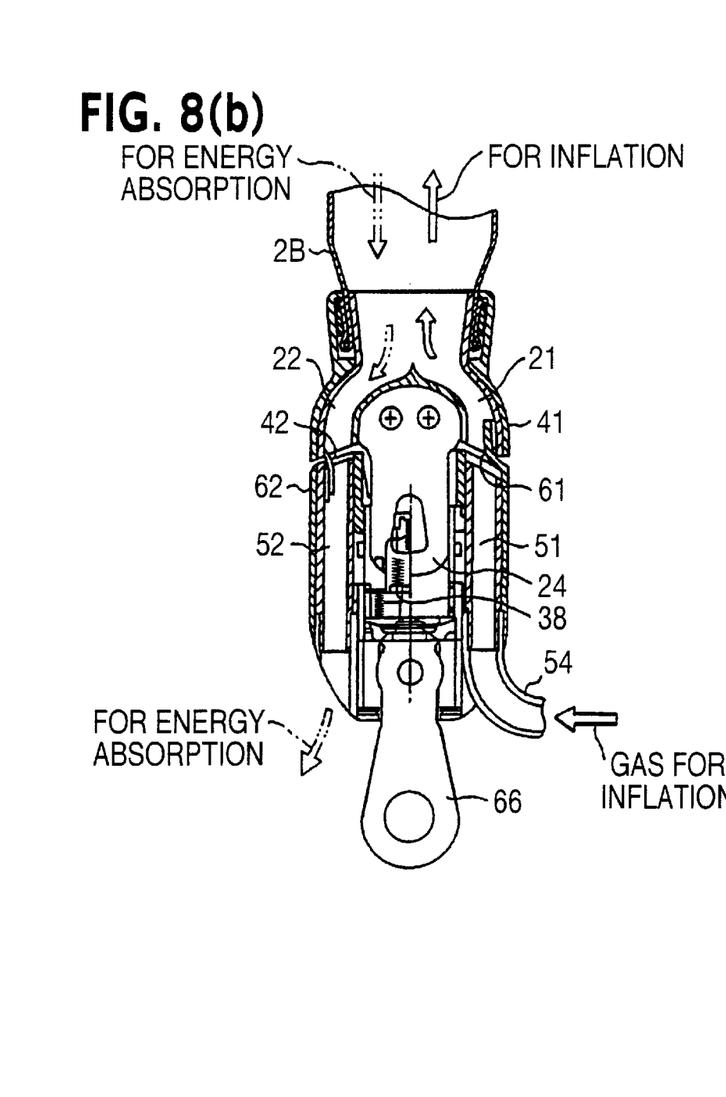

Hereinafter, the entire structure of the air belt of the present invention will be described with reference to FIGS. 5 through 8. FIG. 5(a) is a perspective view showing the tongue 14 and the buckle 16 and FIG. 5(b) is an enlarged view of the buckle shown in FIG. 5(a). FIG. 6(a) through FIG. 6(c), show the structure of the buckle of this embodiment, FIGS. 7(a) through 7(d) show the structure of the tongue, and FIGS. 8(a) and 8(b) are a front view and a sectional view showing the state that the tongue and the buckle are engaged with each other.

As clearly shown in FIGS. 7(a) through 7(d), the tongue 14 comprises a tongue base 18 provided with a first guide path 21 and a second guide path 22 inside thereof, a tongue plate 24 and an anchor 26 which are connected to the tongue base 18, a ring 28 for fixing the air belt 2B to the tongue base 18, and a synthetic resin cover 32 for surrounding the tongue base 18.

The tongue base 18 has a cavity inside thereof. The cavity is divided into two branches extending toward the ends of the tongue (the side that is inserted into the buckle) whereby the first guide path 21 and the second guide path 22 are formed.

Each guide path 21, 22 has an opening at the end of the tongue. The openings are closed by a seal member 41, 42. The seal member 41, 42 can be opened when gas pressure is applied, as mentioned later.

The anchor 26 is provided with an aperture formed therein. The end of the lap belt 3 is inserted through the aperture and then connected to the anchor 26.

The tongue plate 24 is inserted into a tongue-plate inlet 34 (FIGS. 5 and 6) of the buckle 16 such that a latch hole 36 is latched with a latch pawl of a latch mechanism 38 in the buckle 16. Pressing a press button 40 provided in the buckle 16 releases the latching. At the same time, the tongue plate 24 is pushed out of the buckle 16 by a spring.

As clearly shown in FIGS. 6(a) through 6(c), the buckle 16 is provided with a first gas path 51 and a second gas path 52 inside thereof. The first gas path 51 is connected to an inflator 58 (the gas generator) through a hose 54.

The top (the surface confronting the tongue) of the buckle 16 is provided with a seal member 61 for closing the first gas path 51 and a seal member 62 for closing the second gas path 52.

In this embodiment, the outer surface of the buckle 16 is covered by the synthetic resin cover 64 so that the seal members 61, 62 are formed integrally with the synthetic resin cover 64. The synthetic resin cover 64 is provided with tear lines formed in portions thereof above the gas paths 51, 52 so that areas surrounded by the tear lines become the seal members 61, 62. As the gas pressure is applied, the synthetic resin cover 64 is torn along the tear lines. As a result of this, the seal members 61, 62 open just like flaps as shown in FIG. 5(b).

The lower end of the second gas path 52 opens downwardly at the bottom of the buckle 16 whereby the gas from the second gas path 52 is discharged downwardly.

The buckle 16 and the inflator 58 have brackets 66, 68, respectively for fixing them to the vehicle body member.

Hereinafter, the operation of the air belt device as structured above will be described. The occupant sits in the seat and inserts the tongue 14 to the buckle 16 as shown in FIG. 5(a).

In this state, once the inflator 58 is actuated at a vehicle collision, the seal member 61 is first opened by gas pressure as shown in FIG. 8(b) and the seal member 41 is then opened. The gas is supplied through the first guide path 21 in the tongue base 18 to the air belt 2B to inflate the air belt 2B. In this case, since the gas from the inflator 58 flows upwardly through the first gas path 51 and the first guide path 21, little gas pressure is applied to the seal member 42 so that the seal members 42, 62 are still closed.

When the air belt 2B is inflated, the length of the air belt 2B is reduced so that the air belt closely fits to the body of the occupant, as mentioned above.

When the air belt 2B is sufficiently inflated or the occupant is pushed by the inflated air belt 2B, the pressure of the gas filled in the air belt 2B is applied to the seal member 42 through the second guide path 22 so that the seal member 42 opens downwardly and the seal member 62 then opens downwardly. The gas in the air belt 2B is gradually discharged outside through the second gas path 52. This reduces the impact applied to the body of the occupant which is pushed against the air belt 2B.

The gas discharged through the second gas path 52 is discharged downwardly from the buckle 16 so as not to directly hit the occupant.

In this embodiment, even when it is turned upside down, the tongue 14 can be engaged with the buckle 16 to allow the gas to flow in the buckle 16 and the tongue 14 in the same manner as the above.

In this embodiment, as shown in FIG. 8(b), the opened seal member 61, 42 cross the gaps between the tongue 14 and the buckle 16, thereby making the gas difficult to leak from the confronting surfaces in the lateral direction.

EFFECTS OF THE INVENTION

As mentioned above, in the air belt and the air belt device of the present invention, the knit cover is bonded to the outer surface of the folded envelope-like belt in the aforementioned manner, the knit cover will not be deformed relative to the envelope-like belt such as being separated from nor slipping on the envelope-like body. Therefore, the repeated deformation of only the cover is prevented, thereby improving the durability of the cover. In addition, the envelope-like belt is prevented from twisting inside the cover. According to the present invention, the touch of the air belt is also improved

EXPLANATION OF REFERENCE SIGNS IN DRAWINGS

2a . . . normal belt 2b, 2B . . . air belt

3 . . . lap belt

10 . . . envelope-like belt 11, 11' . . . adhesive layer

12 . . . knit cover

14 . . . tongue

16 . . . buckle

21 . . . first guide path

22 . . . second guide path

34 . . . tongue-plate inlet 41, 42, 61, 62 . . . seal member

51 . . . first gas path

52 . . . second gas path

The priority document her, Japanese application H09-332977, filed on Dec. 3, 1997, is hereby incorporated by reference.

I claim:

1. An air belt comprising: a folded body which is an envelope belt folded into a band configuration; and a cover extendable for covering the folded body of the envelope belt, the envelope belt being inflatable by introduced gas, said air belt being characterized in that the inner surface of the cover is bonded to the outer surface of the folded body.

2. An air belt as claimed in claim 1, characterized in that substantially the entire outer surface of the folded body is bonded to the inner surface of the cover.

3. An air belt as claimed in claim 1, characterized in that parts of the outer surface of the folded body are bonded to the inner surface of the cover.

4. An air belt as claimed in claim 3, characterized in that the bonded portions between the folded body and the cover are arranged at intervals in the longitudinal direction of the folded body.

5. An air belt as claimed in claim 1, characterized in that the bonding is provided by heating thermoplastic resin interposed between the folded body and the cover.

6. An air belt as claimed in claim 1, characterized in that the bonding portion between the cover and the folded body has such strength that-the bonding is cancelled when the folded body is inflated.

7. An air belt as claimed in claim 1, characterized in that overlapped portions of the envelope-like belt in the folded state are bonded to each other.

8. An air belt device comprising:

an air belt which is inflatable;

a gas generator for supplying gas into said air belt to inflate said air belt; and a belt engagement device including a tongue to which said air belt is connected and a buckle which said tongue is engaged with;

said air belt device being characterized in that said air belt is an air belt as claimed in claim 1.

* * * * *